United States Patent [19]

Danos

[11] 4,229,764
[45] Oct. 21, 1980

[54] VISIBILITY EXPANDER

[76] Inventor: Michael Danos, 407 Muddy Branch Rd., Gaithersburg, Md. 20760

[21] Appl. No.: 921,886

[22] Filed: Jul. 3, 1978

Related U.S. Application Data

[63] Continuation-in-part of Ser. No. 896,208, Apr. 13, 1978, abandoned, which is a continuation-in-part of Ser. No. 751,680, Dec. 17, 1976, abandoned.

[51] Int. Cl.² .............................................. H04N 7/18
[52] U.S. Cl. ..................................... 358/160; 358/96; 358/111; 358/166; 364/515
[58] Field of Search ................. 358/96, 111, 160, 166; 364/515

[56] References Cited

U.S. PATENT DOCUMENTS

| | | | |
|---|---|---|---|
| 3,214,515 | 10/1965 | Eberline | 358/96 |
| 3,249,690 | 5/1966 | Schubert | 358/96 |
| 3,354,266 | 11/1967 | Dinenno | 358/96 |
| 3,678,188 | 7/1972 | Okumura | 358/96 |
| 3,706,851 | 12/1972 | Froehlich | 358/96 |
| 3,936,598 | 2/1976 | Newitt | 358/96 |
| 4,013,833 | 3/1977 | Zimmerman | 358/111 |
| 4,020,279 | 4/1977 | Gautier | 358/96 |
| 4,125,858 | 11/1978 | Hounsfield | 358/111 |

OTHER PUBLICATIONS

Revesz et al., "Electronic Techniques for Radiological Image Processing," *Medical and Biological Engineering*, vol. 7, pp. 393-399 (1969).
Bickel et al., "A Delay-Line Synthesized Filter Bank with Electronically Adjustable Impulse Response," Federal Scientific Corporation, pp. 489-496.

*Primary Examiner*—Howard W. Britton
*Attorney, Agent, or Firm*—Howard L. Rose

[57] ABSTRACT

Disclosed is a visibility expander of relatively simple and inexpensive construction for use in reading X-ray photographs. It comprises a TV picture tube and monitor coupled, together via a low pass filter and window amplifier in series as stated. Both the expansion factor and the midpoint of the window(amplifier transfer characteristics are continuously variable so that the operator may better detect changes to picture contrasts. It may be used by doctors, X-ray technicians, investigative agencies and others who need a simple and inexpensive device for analyzing X-ray photographs.

36 Claims, 29 Drawing Figures

FIG. 22
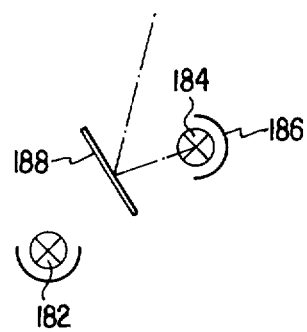
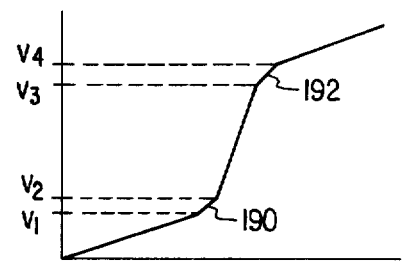
FIG. 23
FIG. 24
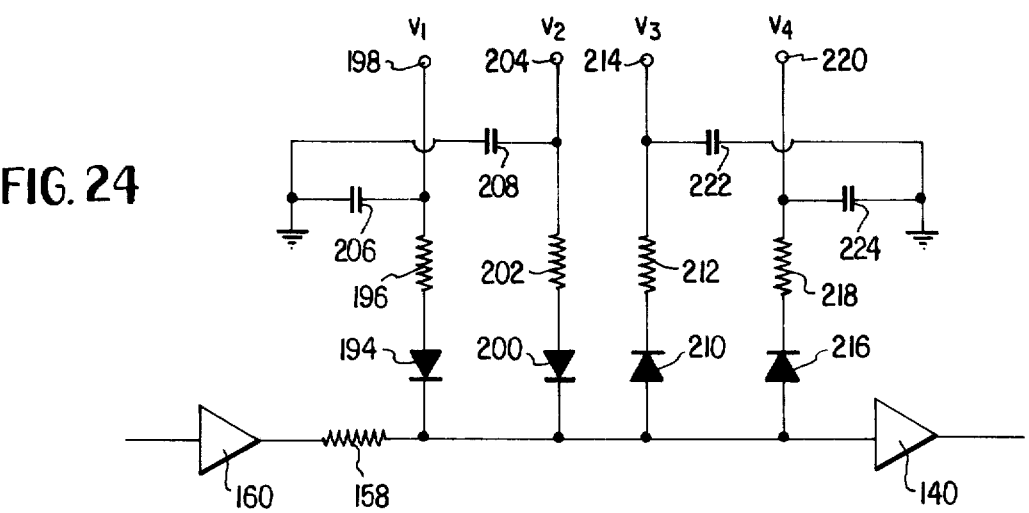
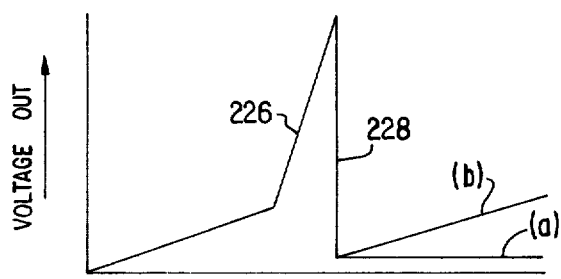
FIG. 25

VISIBILITY EXPANDER

RELATED APPLICATIONS

This application is a continuation-in-part of my co-pending application Ser. No. 896,208 filed Apr. 13, 1978, now abandoned, which is a continuation-in-part of my application Ser. No. 751,680 filed Dec. 17, 1976, for Visibility Expander, now abandoned.

BACKGROUND OF THE INVENTION

This invention relates to an arrangement for electronically processing photographs and more particularly is directed to an analog system adapted for aiding doctors in reading human X-ray photographs, or law enforcement officers in looking for hidden explosives in luggage, etc.

When taking human X-rays, the dosage must necessarily be very limited so that neither the patients nor the person involved in taking the X-ray are exposed to too much radiation. Because of the limited dosage of radiation, or, more generally, when looking for low contrast objects in X-ray pictures, as, for example, resulting from plastic explosives, soft tissue abnormalities, etc., the X-ray picture tends to have deviations or islands of grains which create background noise when the photograph is scanned and displayed by a TV picture system which introduces additional noise. In the past, this problem has been attacked by passing the electronic signal picked up by a TV camera through a filter of averaging device. However, noise remains a limiting factor and particularly interferes with a doctor's ability to detect small changes in a relatively large body organ such as might be the case when the doctor is trying to read an X-ray photograph to determine if a patient has an inflamed appendix; or in equivalent cases in a more general context. There are, of course, complex computerized techniques for processing X-ray photographs but these require complex and expensive equipment beyond the budget of most medical facilities or other users and require a technical expertise in a completely different field well beyond the skill of even the most able medical doctor, or other users who may have a need for such devices.

Most if not all of the approaches to improvement of the readability of X-ray pictures other than perhaps certain computer techniques rely on edge enhancement in one form or another. Such approaches do not overcome or attempt to overcome the basic problem in X-ray picture interpretation, the limitation on information recognition resulting from noise. There is no attempt in such devices to literally dig the available information out of the noise. Edge enhancement does not accomplish this and in fact only enhances what is already visible and thus has found little acceptance in the 20 years since issuance of the Kovasznay U.S. Pat. Nos. 2,900,442 and 2,903,507.

Information theory as developed by Wiener and others defines the interplay between the limitation of recognition of density differences and size of objects detectable but no approach known to the inventor has been made that applies the general knowledge in this field to viable methods of improving techniques of reading X-ray pictures.

The present invention is directed to an electrical system which is of relatively simplified and inexpensive construction and which permits as a limiting case all information available in an X-ray film (or the like) to be extracted.

The basic components of the system consist of a TV camera for reading the X-ray photograph, a low pass filter for filtering out noise, a window amplifier for electronically processing or enhancing the display and a TV monitor or display tube for presenting either a normal or processed display of the X-ray photograph to the doctor or X-ray technician.

The present invention recognizes that in order to detect relatively small changes in signal which in one example are indicative of changes in soft tissue, the signal-to-noise ratio of the information must be greatly improved so that contrast (represented by signal amplitude differences) can be expanded without destroying the ability to detect meaningful signals. The system has certain constraints: (1) frame rate must not introduce flicker, typically not less than 60 frames/sec or 30 frames/sec with interlaced scans, (2) the beam size should be small enough to detect the smallest desired object but no smaller since in all films (X-ray and others) as well as the camera viewing surfaces, grain produces large amounts of noise and the smaller the beam the more the noise; (3) the scan rate (and therefore number of lines per frame) should be kept low to maintain the information signals at as low a frequency as possible keeping in mind that grain and conventional video noise is concentrated at higher frequencies, and (4) in order to detect all desired detail, all parts (i.e. areas) of the picture or other object or view to be investigated must be interrogated. Thus, unlike conventional T.V., scan lines preferably should abut one another so that no detail is lost.

The present system includes a window amplifier or slice amplifier with a knob by means of which the viewer may vary the contrast intensity of the display on a TV monitor from a normal display to a maximum contrast intensity over a predetermined but variable range of intensities. The purpose is to give the user maximum control over the diagnosis of such things as an inflamed appendix, lung lesions and the like whereby if desired, he may switch back and forth between normal and various intensity displays until he is satisfied with his diagnosis of the X-ray photograph under consideration. Density variations are not great when viewing soft tissues or the like and the object to be viewed may be of the order of one centimeter in diameter. It is necessary therefore to enhance contrast, a process which per se increases noise effects, an effect which cannot be tolerated. In the present invention a large proportion of the noise effect is eliminated prior to increasing contrast thereby reducing total noise while enhancing desired image contrast.

Photograph light intensity differences are increased by passing the output of a low pass filter connected to a TV camera through a window or slice amplifier. An entire photograph is scanned at 60 Hz either in a conventional manner or alternately by first a horizontal sweep, then a vertical sweep. When employing the criss-cross scan the picture is illuminated by stroboscopic light flashes after the completion of both the horizontal and the vertical scan. The electrical output passes through a low pass filter to give long-term averaging (filtering) in both vertical and horizontal directions. Picture tube and TV camera dot size can be increased (both for interlace and no interlace) and sweep speed reduced (also number of lines reduced) as compared with normal high resolution TV picture systems.

It is therefore one object of the present invention to provide an improved picture processor or visibility expander.

Another object of the present invention is to provide a relatively simplified analog type electronic visibility expander.

Another object of the present invention is to provide a visibility expander particularly adapted for use by physicians and/or medical technicians in reading human X-ray photographs.

Another object of the present invention is to provide a simplified and inexpensive visibility expander of general utility for use by the medical profession, law enforcement agencies and the like.

Another object of the present invention is to provide a relatively simplified and inexpensive circuit device which may be used as a human element diagnostic tool at almost all medical facilities.

Another object of the present invention is to provide a relatively simplified and inexpensive device for detecting light intensity differences in all types of X-ray photographs and for other transparencies or pictures.

DESCRIPTION OF THE DRAWINGS

The above and further objects and advantages of the invention will be more apparent upon reference to the following specifications, claims and appended drawings and wherein:

FIG. 22 is a diagram of a simplified embodiment of the system when it is used without the "criss-cross" feature;

FIG. 23 shows the characteristic for a window or slice amplifier in which the corners of the transfer curve have been rounded off;

FIG. 24 is a simplified circuit for providing this feature; and

FIG. 25 shows a characteristic curve useful in eliminating glare.

DESCRIPTION OF THE PREFERRED EMBODIMENTS

Figure 1:
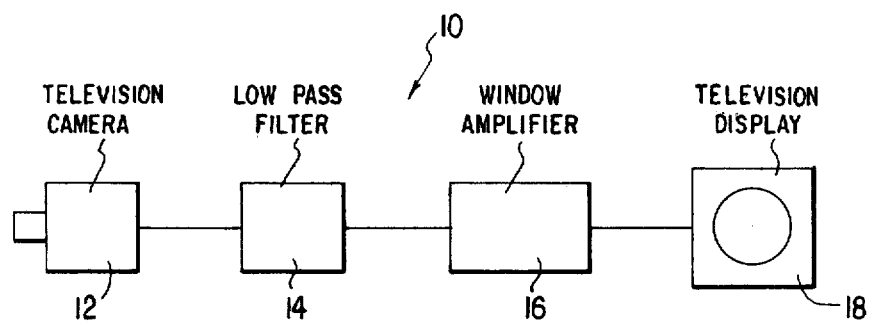
FIG. 1 is a simplified block diagram of the visibility expander of the present invention.

Referring to the drawings, FIG. 1 is a general overall block diagram of the visibility expander system of the present invention as generally indicated at 10. It comprises a television camera 12 connected through a low pass filter 14 and a window amplifier 16 (sometimes called a slice amplifier) to a television display 18. The X-ray photograph or other information to be analyzed is viewed by the camera 12 and the physician (or other user) views the display 18 upon which a picture of the photograph appears. The picture on the display 18 may be modified by the user through the variation of certain parameters of the window amplifier 16 so that the display is continuously variable from normal to a modified or enhanced condition such that the physician is aided in the diagnosis of any ailment which may appear from the X-ray photograph or another user such as a law enforcement officer can detect the contrast of a plastic bomb in luggage or the like.

Figure 2:
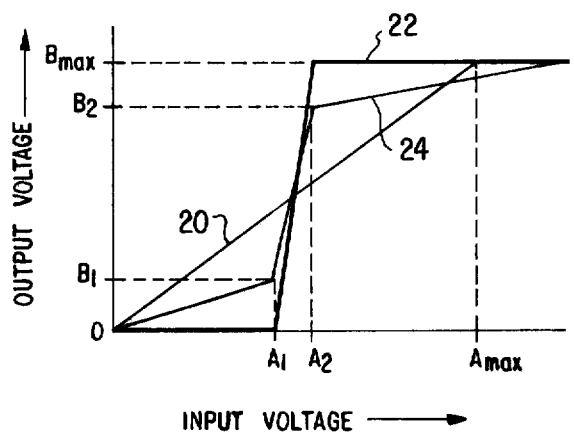
FIG. 2 is a diagram showing the characteristics of a window amplifier or slice amplifier according to this invention.

FIG. 2 shows the transfer characteristic of the window amplifier constructed in accordance with the present invention. It is a plot of output voltage as a function of input voltage. The straight line for a linear amplifier is shown at 20 for the purposes of comparison. Curve 22 shows the characteristic of a saturating window amplifier which goes in a single straight line from 0 output voltage to maximum output voltage, $B_0$ to $B_{max}$ between the points $A_1$ and $A_2$. Curve 24 is a plot of a non-saturating window amplifier which has a first slope from 0 to $A_{max}$, a steeper slope between $A_1$ and $A_2$, and again a lesser slope from $A_2$ to $A_{max}$. It is distinguishable from the saturating window amplifier in having three separate or different linear arrangements.

Figure 3A:
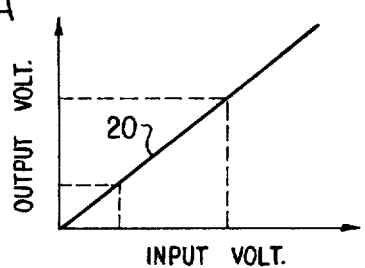
FIG. 3A through 3D show various expansion factor characteristics for the window or slice amplifier of this invention.
Figure 3B:
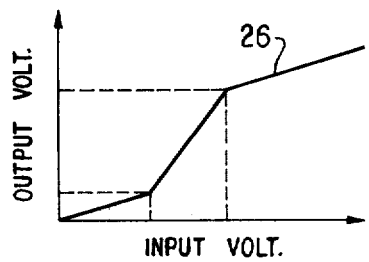
Figure 3C:
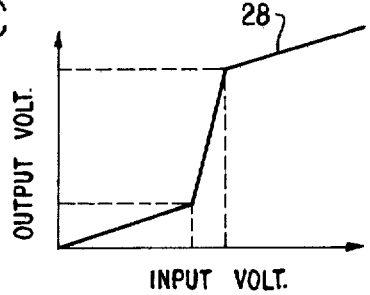
Figure 3D:
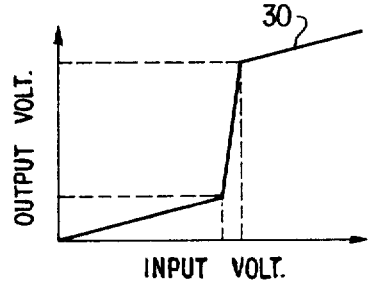

FIGS. 3A, 3B, 3C and 3D are similarly plots of output voltage as a function of input voltage and show the characteristics of different amplifiers. A linear characteristic is shown in FIG. 3A at 20, again for the purposes of comparison, and is described as having an expansion factor of 1. FIG. 3B shows a window amplifier characteristic 26 having an expansion factor of approximately 2, FIG. 3C shows a window amplifier having an expansion factor of approximately 4, and FIG. 3D shows a window amplifier having an expansion factor of approximately 10. The window amplifier of the present invention is preferably variable from the straight line characteristic 20 (expansion factor = 1) to a relatively steep slope or quite high expansion factor as desired.

Figure 4:
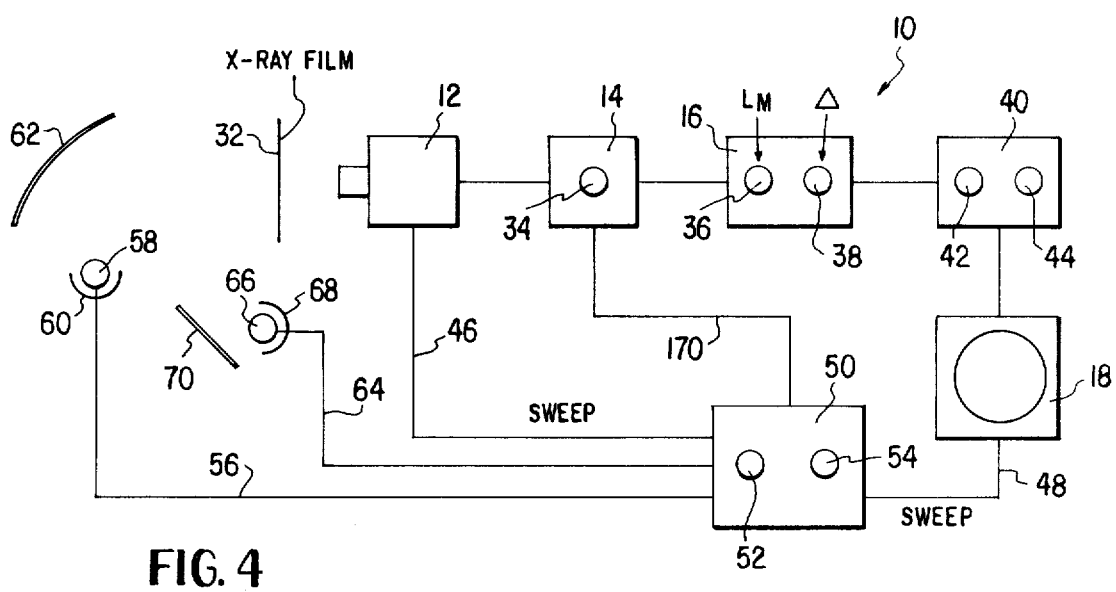
FIG. 4 is a detailed block diagram of the overall visibility expander of this invention.

FIG. 4 is a detailed overall block diagram of a visibility expander in accordance with the present invention in which like parts bear like reference numerals. FIG. 4 shows an X-ray photograph or film 32 viewed by the television camera 12. The output of the television camera 12 feeds the low pass filter 14 which is provided with a filter switching and line switching knob 34 as more fully described below. From the filter 14, the signal passes through the window amplifier 16 including a pair of knobs 36 and 36 labeled $L_M$ and $\Delta$ (delta), respectively, again for purposes more fully described below. Various types of auxiliary image processing may be provided as indicated by the block 40 having a pair of control knobs 42 and 44.

Camera 12 and monitor 18 are synchronized by corresponding sweep signals on the respective leads 46 and 48. These are supplied from a generator 50 which generates the sweep, sync pulse and other signals for the circuit and which include a camera zoom control knob 52 and a camera focusing control knob 54. A stroboscopic flash trigger pulse train is supplied by the generator 50 on output lead 56 to a stroboscopic flash lamp 58 partly surrounded by a reflector 60. Stroboscopic light is directed to the X-ray film 32 from the lamp 58 by a concave reflector or mirror 62. A D.C. signal is also supplied from the generator by way of a lead 64, and this is supplied to a D.C. lamp 66 with reflector 68 and by way of a plain mirror 70 to the X-ray film 32 all for a purpose more fully described below.

In most X-ray pictures, noise is a limiting factor. As the expansion factor of the window amplifier is increased, noise, including noise introduced by the pictures as well as the camera 12 and to some extent external sources, which even without an expansion factor tends to hide information, becomes increasingly disturbing and will hide otherwise discernable information. This noise is decreased in the present system by including the low pass filter 14 in the chain. The filter is a low pass filter with non-peaking roll-off characteristics. Such characteristics are preferable since peaking accentuates noise and artifacts (false images) and sharp cut-off produces phase shifts and can also produce artifacts. The cut-off frequency is preferably switched by the knob 34 to adjust to the needs of the noise versus signal of the particular photograph being viewed by the television camera and the expansion factor being employed.

To understand the signal-to-noise ratio problem it is essential to realize that the noise generated by the grain of the X-ray film, the grain of the viewing surface of the camera 12, phosphors, etc., all of which are quite small in size, is at a frequency considerably above that necessary to reproduce the desired picture elements. Thus, by appropriately interrelating scan rates, beam spot size (focus-defocus) and the pass band of the filter 14 greatly improved signal-to-noise ratios may be obtained at the output of the filter 14.

Specifically as to scan rates, as will be described more fully subsequently, a reduction in scan rate reduces the frequency of the image information and although such also reduces the noise frequency due to film and camera surface grain, these latter frequencies are sufficiently high that they are for the most part readily separated from the signal frequencies by a filter. Moreover, the frequencies of the electronic noise received remain at their original high values and are easily filtered.

The reduced band width of the filter reduces the resolution of the system, but the resolution that is available may be fully utilized by not only decreasing scan rate but reducing the number of scan lines normally used in picture presentation.

The above is accomplished by decreasing the readout speed (line scan rate) while at the same time increasing beam size so as to view only that which is of interest thereby to keep the frame rate at the normal value such as 30 frames per second. This increase in beam size and decrease in scan rate both contribute to a better signal-to-noise ratio of the camera.

A further preferred construction for the present invention involves the provision of a criss-cross scan. Theoretically an alternating horizontal-vertical-horizontal-vertical scan mode yields a factor of the $\sqrt{2}$ improvement in the signal-to-noise ratio when compared with a purely horizontal or purely vertical scan mode. Possibly more important is the equal treatment of horizontal versus vertical structures in the picture by the criss-cross scan system. This can lead to better recognizability of the objects in the photograph by the doctor or technician since vertical detail is not lost.

Figure 15:
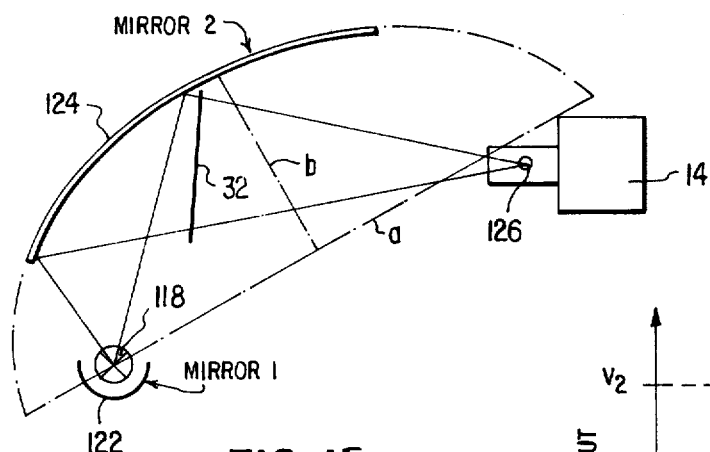
FIG. 15 is a diagrammatic side view of the opitcal system for the stroboscope illumination.

When employing the criss-cross scan made it is essential to use a stroboscope in order to insure that each picture element receives the same predetermined amount of illumination before each interrogation by the scanning beam. In normal operation the time interval between interrogations is the same (one thirtieth of a second) for all picture elements. As can be easily understood by anyone versed in the art, in a criss-cross scan the time interval between interrogations is different for different picture elements, say for an element at the bottom left corner and another element at the top right corner of the picture. If one would employ the usual steady illumination, as shown in FIG. 15, lamp 118, and mirror 122, the photo sensitive surface of the T.V. camera viewing these two picture elements would accumulate different charges from frame-to-frame in a cross-scan since the light received over the interval between interrogation is integrated over different time intervals. Such would lead to intolerable shading of the picture.

Figure 5:
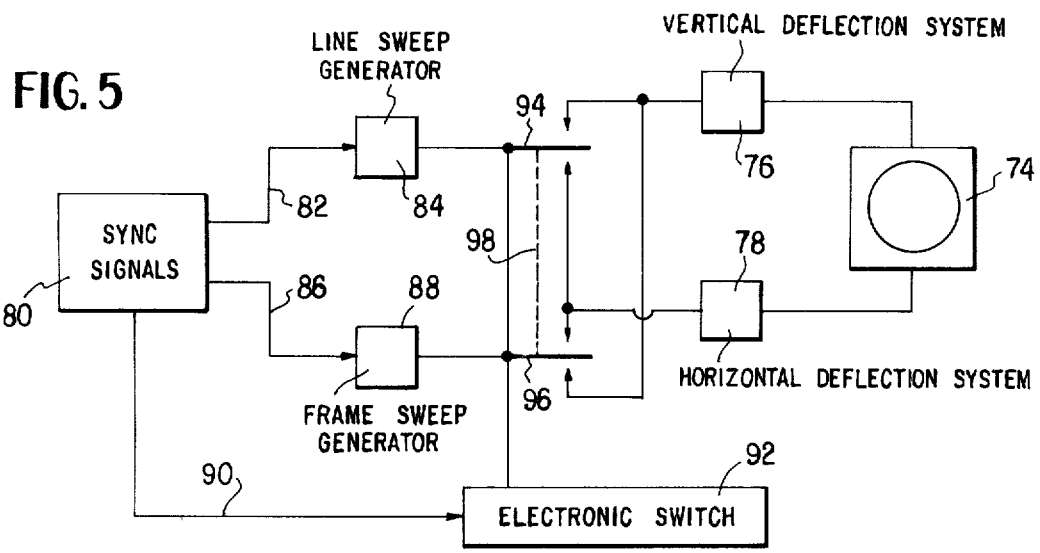
FIG. 5 is a block diagram of an arrangement for obtaining a "criss-cross" scan.

One arrangement for obtaining a criss-cross scan is illustrated in FIG. 5. FIG. 5 shows a monitor 74 receiving sweep signals from a vertical deflection system 76 and horizontal deflection system 78. A source 80 of sync signals supplies these signals by way of a lead 82 to a line sweep generator 84 and by way of a lead 86 to a frame sweep generator 88. They are also supplied by way of a lead 90 to an electronic switch 92 which drives the movable contacts 94 and 96 which are shown by a dashed line 98 to be ganged together and which are connected respectively to the output of line sweep generator 84 and frame sweep generator 88. The line sweep generator signals and frame sweep generator signals are alternated by the electronic switch 92 between the vertical deflection system 76 and the horizontal deflection system 78 to produce the criss-cross or alternating horizontal-vertical-horizontal-vertical scan mode on the monitor 74. Deflection systems which can handle both the low frequency frame deflection rate and the high frequency line deflection rate are presently commercially available.

The size and scan positioning of the beam is chosen such that all areas of the viewing surface of the camera 14 are viewed, i.e. the line structure is eliminated; this being accomplished by having contiguous scan lines in abutment.

An example of a system utilizing the present invention contemplates a 20 cm×20 cm viewing area. The size of the object to be detected (resolution element) is 2 mm. Crossed scan is employed.

The required number of lines for each scan direction is 20/.02=100 lines. The number of frames is 60 per sec.; 30 per sec. in each direction. The number of lines per second is 60×100=6000. The number of resolution elements per second is 6000×100=600,000. The required band width of the filter is 600,000π/2=0.9 MHz, a quite low frequency in terms of present day video systems which have band widths of 30 MHz; to be specific a reduction by the factor of 33⅓.

If the area of the TV tube of the Videocon is 20 mm×20 mm, the required beam diameter is 0.2 mm. (2 mm×1/10, the demagnification factor).

The above is one example of the application of the present invention to a specific system employed to observe an object of a specific minimum size. Adjustments are made to X-ray picture (or the object) size, camera image reduction, etc. In any event regardless of the size of the object to be viewed not until the object becomes so small as to require the use of the entire bandwidth of the TV system does the system of the invention become as noisy as present viewing systems.

The above example illustrates the presence of two distinct effects. On the one hand, the low-pass filter with a cut-off frequency of 0.9 MHz eliminates all electronic noise of frequencies above 0.9 MHz, which reduces the electronic noise voltage by about a factor of 8 in the contemplated example. On the other hand the size of the resolution element of 2 mm diameter averages out the picture noise having spatial frequencies greater than 0.5 $mm^{-1}$ (1/2mm) (and, similarly, Videcon surface graininess of having spatial frequencies above 5 $mm^{-1}$). Specifically, the size of the spot has the effect of a low pass filter capable by proper size selection as in the above example of averaging the grain noise of the picture so that the effect on signal-to-noise ratio is negligible.

The system as described above, when provided with various controls to be discussed, allows the user first to see the picture with high resolution in a high quality reproduction, substantially as he would see it in normal use of a light box; then he can expand the contrast centered around a desired gray level, and he can do that until the (picture and/or system) noise begins to hide the picture content. As an example, let us assume that this happens at an expansion factor of 10. Now he can decrease the noisiness of the picture presented on the monitor by decreasing the resolution of the system in a controlled manner, in that both the camera and monitor beam spot sizes are increased, the line number is decreased, and the bandwidth is diminished, in a matched manner, as explained in the exmple given above, and he can do it to precisely the extent required in each particular case. In the above example, he now can increase the expansion by an additional factor of 6 (as set forth above), thus achieving an expansion factor of 60, this way rendering very small density differences visible to the eye. It should be obvious that by decreasing the resolution and the other parameters in analogous manner further, the observer could render visible even the minutest density differences, up to the limits imposed by the quantum mottle associated with the limited number of X-ray quanta permissible in any particular context.

In short, the invention concerns an apparatus and method which allows in a most simple manner the user to adjust the characteristics of the apparatus such that for any required object size (picture resolution) the smallest density difference compatible (at that resolution) with the quantum nature of the X-rays can be made visible to the eye.

Figure 6:
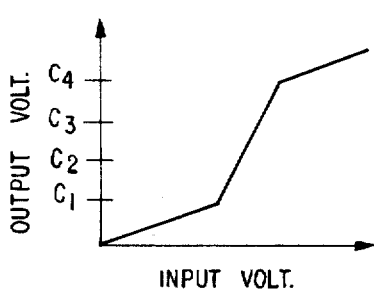
FIG. 6 is a diagram showing an additional method of visibility enhancement.
Figure 7:
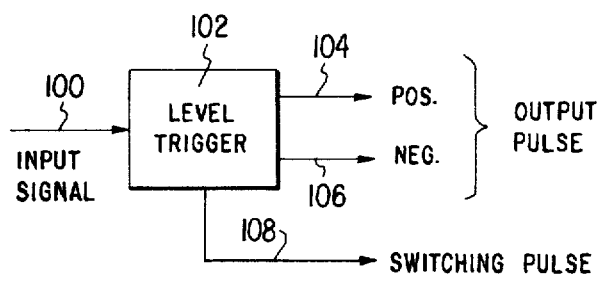
FIG. 7 is a simplified block diagram for obtaining visibility enhancement or contouring as presented by the diagram in FIG. 6.

After passing through the filter 14 and window amplifier 16, of FIG. 4, the signal can be further treated in block 40 to further enhance visibility. One type of additional treatment is contouring as illustrated in FIG. 6 which is a plot of output voltage as a function of input voltage. By way of example, block 40 may comprise triggering devices (for example, Schmitt triggers) to provide short pulses as the signal voltage from the window amplifier crosses one or more predetermined levels such as the levels $C_1$, $C_2$, $C_3$, and $C_4$ in FIG. 6. FIG. 7 shows this arrangement where an input signal on a lead 100 is applied to a level trigger circuit (such as a Schmitt trigger) 102 to produce a positive output pulse on lead 104, a negative output pulse on lead 106 and a switching pulse on lead 108 when the signal crosses one or more of the levels $C_1$ through $C_4$ in FIG. 6. This may be used to put on, for example, dark contour lines by taking the negative output pulse or a light contour line by taking the positive output pulse. It is apparent that in some instances it may be desirable to switch this feature in and out, choose one, two or a number of different contour features as desired.

Figure 8:
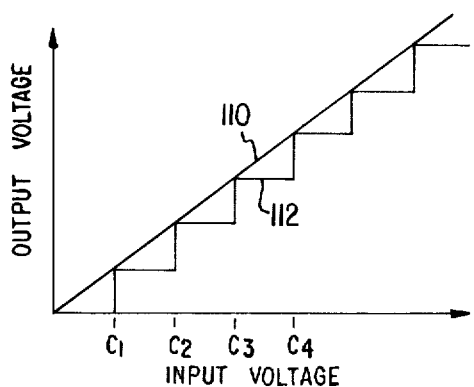
FIG. 8 is a diagram illustrating further processing in the form of a quantized output.
Figure 9:
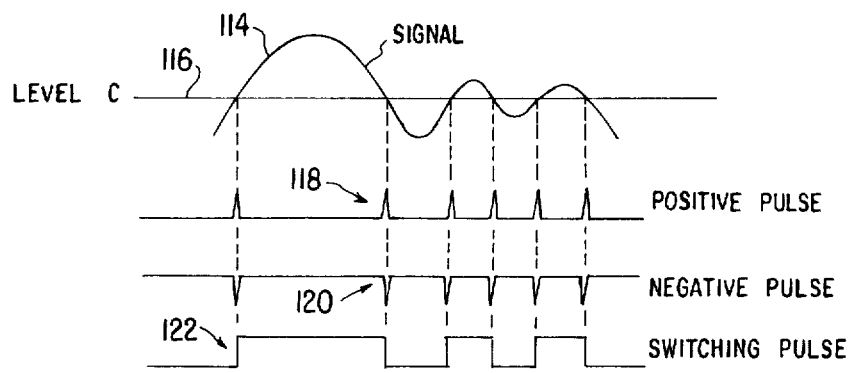
FIG. 9 shows switching pulse waveforms for producing a quantized signal.
Figure 10:
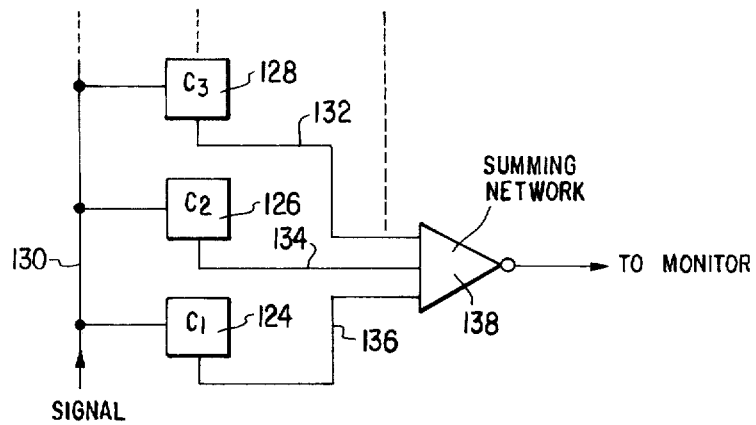
FIG. 10 shows a quantization summing network.

A further feature which may be incorporated in the auxiliary image processing device 40 after the filter and window amplifier is signal quantizing as illustrated in FIG. 8. This figure is a plot of output voltage as a function of input voltage and shows a linear characteristic at 110 and a stepped or staircase characteristic at 112. Using the same triggering device 102 of FIG. 7, the discontinuous (stepped) grey level output 112 of FIG. 8 can be implemented in the manner illustrated in FIGS. 9 and 10. FIG. 9 is a series of waveforms and at 114 shows a signal with several crossings of a level C as indicated by the line 116. Each level of crossing produces a positive pulse as illustrated by the positive pulse train 118 and also produces the negative pulse trail 120. The switching pulses which have leading and trailing edges corresponding to the level of crossing of the signal and which appear on the output lead 108 of FIG. 7 are illustrated at 122 in FIG. 9. FIG. 10 illustrates the employment of a plurality of level triggering devices, each one like the device 102 of FIG. 7 but set to trigger at the different levels illustrated in FIG. 6. The triggering devices 124, 126, and 128 are labeled $C_1$, $C_2$, $C_3$ and of course, may be as numerous as desired. They are shown as connected to a common signal input 130 and the switching outputs corresponding to the output 108 of FIG. 7, as indicated at 132, 134 and 136 in FIG. 10, are shown as connected to the monitor through a summing network 138. Again, this feature is preferably arranged so that it can be switched in or out. This may be done selectively or in groups as desired.

Figure 11:
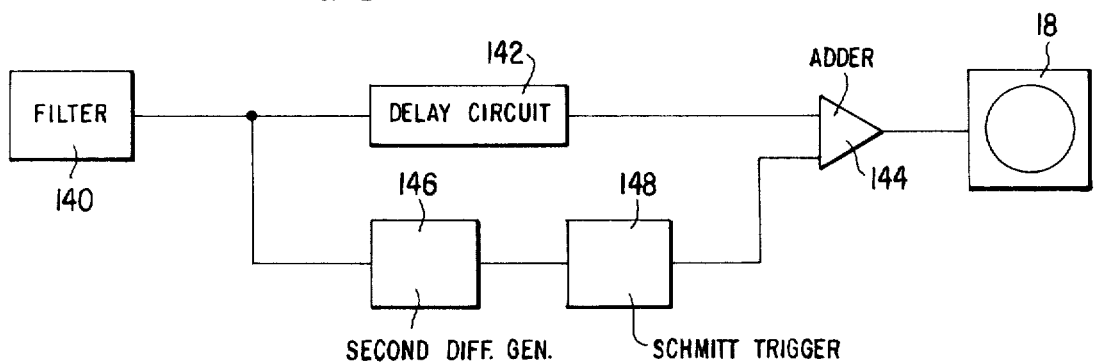
FIG. 11 shows an edge enhancement circuit.
Figure 12:
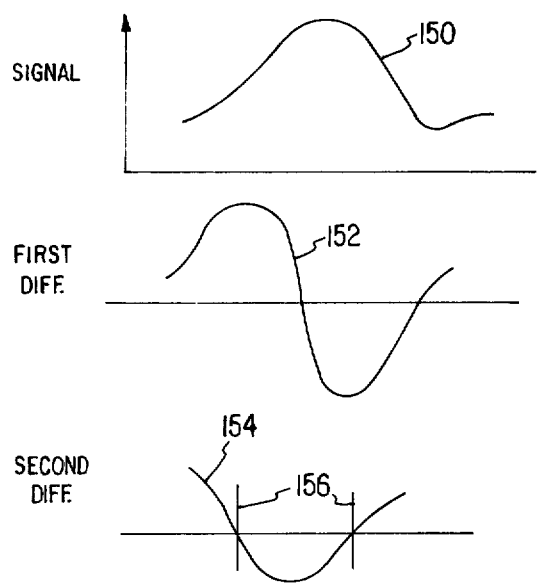
FIG. 12 illustrates waveforms for the edge enhancement circuit of FIG. 11.
Figure 13:
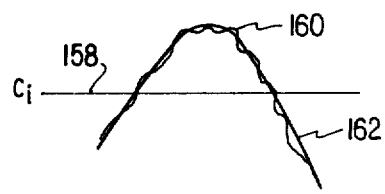
FIG. 13 is a diagram showing a typical noisy signal before and after filtering.

A feature which may be incorporated into the system in place of the contouring just described is the feature of edge enhancement. In this embodiment, as illustrated in FIG. 11, incorporated in the auxiliary image processing unit 40 of FIG. 4, is a filter 140 which feeds a signal through a delay circuit 142 and an adder 144 to the monitor 18. The signal also passes through a second differential generator 146 and a zero crossing Schmitt trigger 148 to the adder 144. The action of this circuit is illustrated by the waveforms in FIG. 12 where a signal is shown at 150, the first differential of that signal at 152, the second differential of the signal at 154 and the zero crossing Schmitt trigger output pulses at 156. Since the differentiation introduced by circuit 146 involves a time delay, it is necessary to include the delay circuit 142. This places the Schmitt pulse 156 which is of the same polarity for zero crossings both from above and below at the inflection point. The result is illustrated in FIG. 13 with the zero crossing illustrated at 158, a noisy signal before filtering at 160 and the signal after filtering by the circuitry illustrated in FIG. 11 at 162. The edge enhancement described has the disadvantage of being more noise sensitive than the contouring triggered by the crossing of the signal through a given level and for this reason the contouring is preferred over the edge enhancement of FIGS. 11 through 13.

Figure 14:
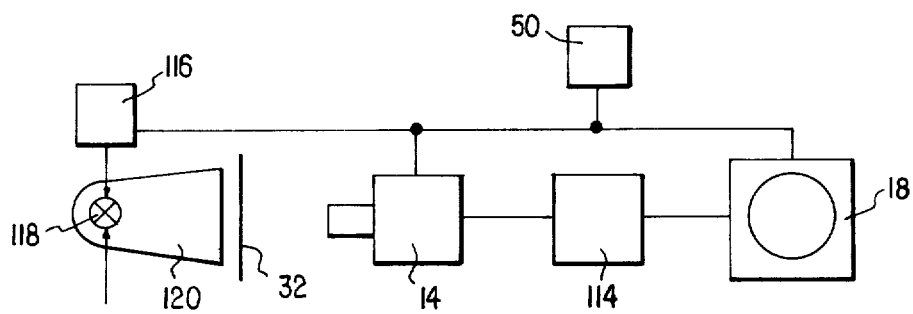
FIG. 14 is a block diagram showing the system of the present invention used with a stroboscope flash circuit.

FIG. 14 shows a simplified stroboscopic flash system for use with the criss-cross scan in which like parts bear like reference numerals. The sweep, switch, control, sync, etc. generator 50 supplies suitable signals to the TV camera 14 and the monitor 18 so that the two of these are synchronized with the same sweeps. The window amplifier and auxiliary image processing are lumped together in a single block 114 in FIG. 14. The sync signal is also supplied to a stroboscopic lamp driver circuit 116 which flashes light onto the X-ray picture 32. The strobe flash lamp 118 is shown in FIG. 14 as surrounded by a reflector 120 so that the stroboscopic light is concentrated on the film 32 for viewing by the camera 14.

FIG. 15 shows a modified stroboscopic illumination system, again with like parts bearing like reference numberals. In FIG. 15, lamp 118 is provided with a conventional reflector or mirror 122 labeled Mirror No. 1, and with a second mirror 124, labeled Mirror No. 2, arranged to act as a condensor. Mirror 124 is ellipsoidal such that the foci lie at the flash lamp 118 and the TV camera objective 126, respectively. The lines a and b are the major and minor axes respectively of the ellipsoid. Mirror 122 is a backing mirror used with the condenser mirror 124. However, for large area objects, like a medical chest X-ray, condenser lenses become impractical. Of course, the complete illumination system including the film holder and the TV camera must be provided with a light-tight enclosure to keep the illumination of the film as viewed by the TV camera under precise control.

Figure 16:
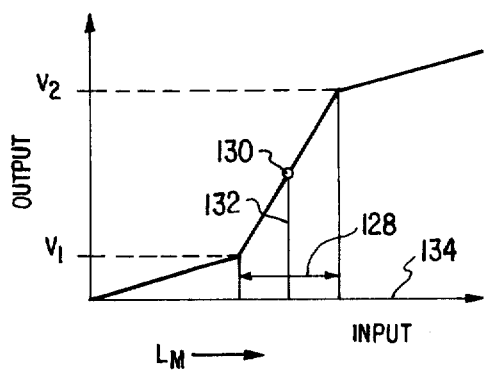
FIG. 16 is a diagram defining a value $L_M$ as midpoint of the linear portion of the window amplifier characteristic.

As previously indicated, FIG. 4 shows the window amplifier 16 with a midpoint control 36 labeled $L_M$ and an expansion factor control labeled $\Delta$(delta). These are defined in FIG. 16 which is a plot of the output voltage as a function of the input voltage for the window amplifier. The expansion factor delta is the slope of the steep part of the transfer characteristic and is defined as the ratio of the output voltage difference $V_2 - V_1$ to that of the corresponding input voltage indicated by the double-ended arrow 128 in FIG. 16. The midpoint control $L_M$ on the other hand allows the midpoint 130 of the steep part of the transfer characteristic to be placed at any point along the input voltage, labelled 134 in FIG. 16. That is by means of the midpoint control the midpoint 130 of FIG. 16 can be made to correspond to any input voltage level between 0 and the maximum input voltage.

Figure 17:
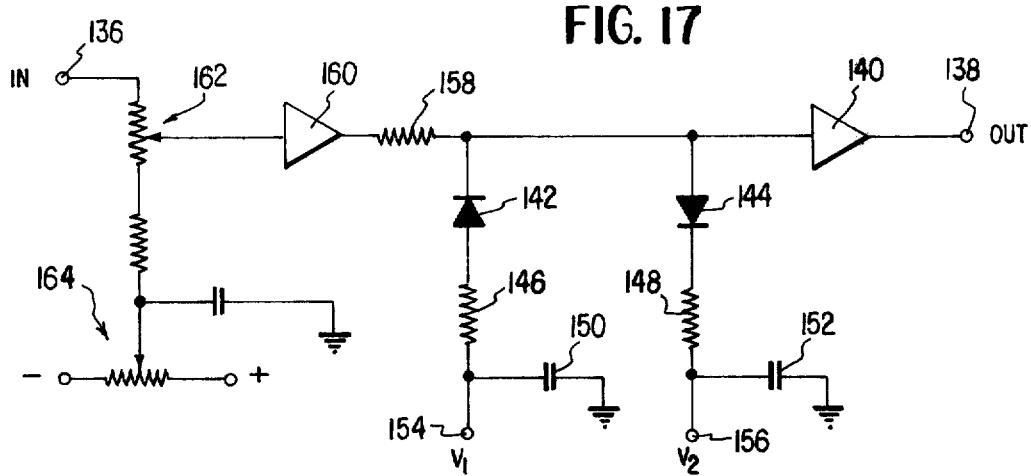
FIG. 17 is a diagram of a circuit for producing a variable expansion factor such as those illustrated in FIGS. 3B through 3D.

FIG. 17 shows a circuit for producing continuous expansion factor and midpoint variations in the window amplifier. The circuit comprises an input terminal 136 and an output terminal 138 between which is connected a window or slice amplifier 140. The input of this amplifier is connected to ground by reversed diodes 142 and 144, resistors 146 and 148, and capacitors 150 and 152. Bias is established by connecting terminals 154 and 156 to suitable D.C. power supplies indicated as $V_1$ and $V_2$ which are preferably variable by a screw-down adjustment or the like. The window amplifier is connected through a coupling resistor 158 to the output of a non-overloading amplifier 160. This has its input connected to a pair of potentiometers 162 and 164. Potentiometer 162 is varied by knob 38 in FIG. 4 and performs the expansion factor or delta control whereas potentiometer 164 is varied by a knob 36 in FIG. 4 and forms the midpoint or $L_M$ control.

Figure 18A:
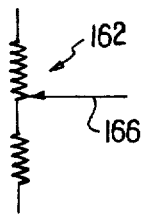
FIG. 18A and 18B are useful in explaining the expansion factor or delta control and the midpoint or $L_M$ control, respectively, of FIG. 17.
Figure 18B:
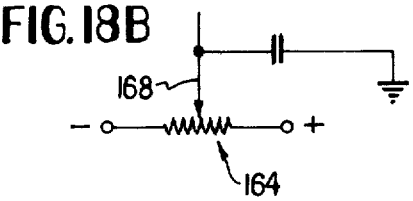

FIG. 18A shows the potentiometer 162 at the bottom of the delta control where the expansion factor is 1, that is, the transfer characteristic is linear. Moving the wiper arm 166 upwardly in FIG. 18A increases the expansion factor continuously as illustrated by the sequence of drawings, FIGS. 3A through 3D. The potentiometer 164 illustrated in FIG. 18B has its wiper arm 168 normally set at the midpoint of the potentiometer resistor and the dark-bright range is achieved by moving the wiper arm to the right or left in FIG. 18B as desired.

FIG. 4 shows that the filter 14 is provided with a cut-off frequency switch. By way of example only, the the system has a 20 MHz bandwidth, Table 1 as follows gives points which are suitable for this switch.

TABLE #1

| Filter Switch Position | 1 | 2 | 3 | 4 | 5 | 6 |
|---|---|---|---|---|---|---|
| Cut-Off (MHz) | 20 | 10 | 5 | 2.5 | 1 | 0.5 |

The same knob on the filter is shown in FIG. 4 as used to control the line number of the sleeve by supplying a signal to the generator 50 over a lead 170. If, by way of example only, the system has a maximum of 1400 lines and interlace, the following six switch positions are suitable as given in Table 2.

TABLE #2

| Switch Position | 1 | 2 | 3 | 4 | 5 | 6 |
|---|---|---|---|---|---|---|
| Line Number | 1400 | 1000 | 700 | 500 | 350 | 250 |
| Interlaced | Yes | Yes | No | No | No | No |
| Criss-Cross Used | No | No | Yes | Yes | Yes | Yes |

If desired, it is possible to optionally provide a separate "interlaced—not interlaced" switch, independent of the line number.

It is apparent the additional switch positions would be provided with 30 MHz systems, such as for the 100 line scan as in the example set forth hereinabove.

Figure 19:
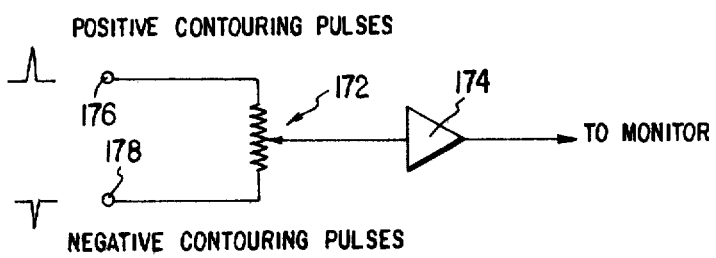
FIG. 19 shows a circuit for forming a contouring dimmer control.
Figure 20:
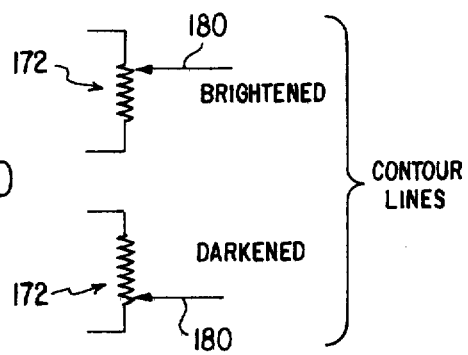
FIG. 20 illustrates the brightened and darkened positions for the contour lines.

FIG. 19 shows a contouring dimmer control potentiometer 172 which connects through an amplifier 174 to the monitor. This receives positive contouring pulses at terminal 176 and negative contouring pulses at terminal 178. FIG. 20 shows the two extreme positions for the contouring dimmer control. At the midpoint position, there is no contouring. When the wiper arm 180 is in the uppermost position, the contouring is brightened and when it is in the lowermost position, as illustrated in FIG. 20, the contouring is darkened.

Figure 21:
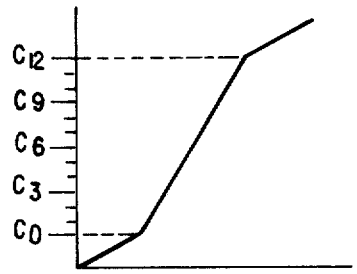
FIG. 21 shows various levels for a contouring control switch.

FIG. 21 shows a plurality of contouring levels labeled $C_0$ through $C_{12}$. If desired, a contouring control switch may be provided and by way of example, a five position contouring control switch might turn on the levels illustrated by Table 3.

TABLE #3

| Example: | | | | | |
|---|---|---|---|---|---|
| Position | 1 | 2 | 3 | 4 | 5 |
| C-levels | | | | | |

TABLE #3-continued

| Example: Position | 1 | 2 | | 3 | | | 4 | | | | 5 |
|---|---|---|---|---|---|---|---|---|---|---|---|
| switched on: | — | 6 | 2 | 6 | 10 | 0 | 2 | 4 | 6 | 8 | 10 | 12 | all |

A switch for producing the discontinuous steps for quantizing levels may also be provided according to Table 4.

TABLE #4

| Position | 1 | 2 | 3 |
|---|---|---|---|
| Discretization Intervals | Off | 0-2-4-...-12 | 0-1-2-...12 |

When this switch is in position 2 or position 3, the contouring control switch described immediately above is disabled. All contour lines (0, 2, 4, . . . 12 in position 2 and 0, 1, 2, 3, . . . 12 in position 3) are switched "ON" and are under the control of the dimmer control circuit of FIG. 19.

All of the potentiometers so far described carrying high frequency signals can be realized by variable gain amplifiers or electronic switches. When a criss-cross sweep is not used, the stroboscopic illumination is not needed and one of the mirrors can be eliminated to allow for illumination only by the D.C. fed lamp. This is illustrated in FIG. 22 where the stroboscopic lamp 182 is not energized and only the D.C. lamp 184 is used. This supplies light to the image by reflector 186 and a plain mirror 188. D.C. feeding is needed to avoid hum in the picture.

The filter switch and line number switch are preferably associated with a common single control knob 34 as illustrated in FIG. 4 for ease of operation. In the lower resolution region (250 to 350 lines), the camera and monitor beams in some instances may have to be somewhat defocused in order for the picture not to "fall apart" on the monitor and in order not to leave a charge behind on the screen of the Vidicon (or Plumbicon, etc.) TV camera. Instead of providing a separate discretizing or quantizing control switch, a hold-down toggle switch may be provided which in the positions 4 and 5 of the contouring control switch changes the operation into the discretized mode. In order to accomodate different picture sizes, or to allow concentration on a part of the picture, the camera preferably is provided with zoom capabilities.

In order to help eliminate noise, it is desirable to round off the corners of the window amplifier transfer characteristics. Specifically such sharp transitions may produce ringing and introduce artifacts. This is illustrated in FIG. 23 which shows a characteristic which is less abrupt or rounded off in the region 190 between the voltage levels $V_1$ and $V_2$ and which is also rounded off in the upper region 192 between the voltage levels $V_3$ and $V_4$. The rounding off is accomplished by the circuitry in FIG. 24, in which as previously shown in FIG. 17, an amplifier 140 is connected through a coupling resistor 158 to a nonoverloading amplifier 160. To produce the lower characteristic curvature, the junction of resistor 158 and amplifier 140 is connected through a diode 194 and a resistor 196 to a terminal 198 at a potential $V_1$ and through a diode 200 and a resistor 202 to a terminal 204 at a potential $V_2$. Terminals 198 and 204 are grounded through the respective capacitors 206 and 208. For the high end round off, the junction is connected through a diode 210 and a resistor 212 to a terminal 214 at a potential $V_3$ and through a diode 216 and a resistor 218 to a terminal 220 at a potential $V_4$. Terminals 214 and 220 are grounded through the respective capacitors 222 and 224. Preferably the potentials $V_1$, $V_2$, $V_3$, and $V_4$ are variable such as by a screwdriver adjustment or the like. Alternatively, one may use diodes with rounded (rather than sharp) cut-off characteristics such as diodes 142 and 144 of FIG. 17.

If desired, it may be helpful in some instances to eliminate glare from the monitor to substitute for the transfer curve as shown in FIG. 2 a characteristic of the type illustrated in FIG. 25 which again is a plot of output voltage as a function of input voltage. Instead of staying high, the characteristic at the end of the linear region 226 drops almost immediately as indicated at 228 to darkness and either stays there as indicated by the remaining portion of the curve at (a) or again raises linearly as indicated at (b) to let features "shine through."

It is apparent from the above that the present invention provides an improved visibility expander and one that is relatively simple and inexpensive so that (1) it can be afforded by almost any user, (2) can be operated by any non-technical person, and (3) puts the operator in complete control so that his experience and expertise is utilized to the fullest in analyzing an X-ray photograph. While described in conjunction with medical applications, it is understood that the present invention may be used in a variety of applications where it may be desirable to read X-ray or other photographs with a relatively simplified and inexpensive device in order to obtain a better understanding of what the photographs show.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim is:

1. A picture visibility expander system comprising a viewing device for producing signals indicative of that which is viewed thereby, a display device, a low pass filter means connected to receive said signals and filter out high frequency components therefrom, a window amplifier connected to receive filtered signals from said low pass filter, said window amplifier having means for expanding the amplitude differences of those of said filtered signals lying in a predeterminable amplitude range, and means for supplying said signals processed by said window amplifier to said display device.

2. A picture visibility expander according to claim 1 wherein said low-pass filter means has a variable pass band and is a filter means with non-peaking roll-off characteristics.

3. A picture visibility expander according to claim 1 wherein the pass band of said low pass filter means is variable between at least the pass band of said viewing device and a pass band approximately at least an order of magnitude less than the pass band of said viewing device.

4. A picture visibility expander according to claim 3 wherein said low pass filter means has non-peaking, roll-off characteristics.

5. A picture visibility expander according to claim 4 wherein the transfer characteristic of said window amplifier is variable.

6. A picture visibility expander according to claim 3 wherein the transfer characteristic of said window amplifier is continuously variable between lower and upper limits.

7. A picture visibility expander according to claim 6 wherein the transfer characteristic of said amplifier is variable from a straight line to an expansion factor of at least approximately ten.

8. A picture visibility expander according to claim 2 wherein said viewing device is a television camera and said display device comprises a television monitor, a sweep generator, and means coupling said sweep generator to both said television camera and said television monitor.

9. A picture visibility expander according to claim 8 wherein said television camera and monitor have a criss-cross scan.

10. A picture visibility expander according to claim 9 wherein said television camera and monitor have alternate frames swept horizontally and vertically.

11. A picture visibility expander according to claim 10 including means for supplying periodic flashes of light to a viewing surface of said television camera.

12. A picture visibility expander according to claim 11 comprising means for causing said flashes to occur at the end of each scanning frame of said camera.

13. A picture visibility expander according to claim 12 wherein said means for causing flashing includes means connected to said sweep generator for synchronizing said flashes to said sweep.

14. A picture visibility expander according to claim 13 including means for directing steady state light onto said viewing surface of said camera.

15. A picture visibility expander according to claim 5 including a contouring circuit coupling said window amplifier to said display.

16. A picture visibility expander according to claim 15 wherein said contouring circuit comprises a plurality of triggering devices coupled to the output of said window amplifier for providing short voltage pulses as the signal voltage from said window amplifier crosses predetermined levels.

17. A picture visibility expander according to claim 16 wherein the amplitude of said short voltage pulses is selectively variable.

18. A picture visibility expander according to claim 5 including a signal quantizer coupling said window amplifier to said display.

19. A picture visibility expander according to claim 5 including an edge enhancement circuit coupling said window amplifier to said display.

20. A picture visibility expander according to claim 5 wherein said window amplifier comprises means for continuously varying over a predetermined range the expansion factor and midpoint of said transfer characteristic.

21. The method of expanding the visibility of certain elements of a view comprising the steps of:
converting the view to a sequence of signals having amplitudes varying as a function of various elements of the view,
conversion being effected by scanning the picture with a beam of energy to form a series of frames comprised of a series of lines, scanning occurring at a frame rate such that flicker is substantially undetectable by the human eye upon subsequent conversion of the signals to a picture, the beam of energy having a transverse size such that signals indicative of an object having a minimum predetermined size in the view may be detected for subsequent viewing upon conversion of the signals, the transverse size of the beam of energy being further such that at a scan and line rate that produces signals at a specified frequency all elements of the view are interrogated by the beam of energy;
substantially eliminating signals above said specified frequency;
processing the signals below said specified frequency to increase the amplitude differences of the signals lying in a predeterminable amplitude range; and
displaying a picture indicative of the processed signals.

22. The method according to claim 21 comprising the further step of flashing the view with strong light at the end of each frame.

23. The method of expanding the visibility of certain elements of a view comprising the steps of
converting the view to a sequence of signals having amplitudes varying as a function of the variations in the objects in the view,
conversion being effected by scanning the view with a beam of energy at a frame rate to prevent substantial flicker detectable by the human eye,
adjusting the transverse dimensions of the beam of energy such that signals indicative of an object having a minimum predetermined size in the view may be detected for subsequent viewing,
scanning the view with a number of lines that are a function of the size of the view and the transverse size of the beam of energy,
deflecting the beam at a rate determined as a function of the number of lines and the frame rate per second,
deflecting the beam transverse to its line scan path such that contiguous scan lines are substantially in abutment,
selectively substantially eliminating signals above a specified frequency that is a function of the number of scan lines per second and the number of scan lines per frame,
processing the signals below the specified frequency to increase the amplitude differences of the signals lying in a predeterminable amplitude range, and
displaying a picture indicative of the processed signal.

24. The method according to claim 23 wherein alternate frames are scanned perpendicular to one another to provide a criss-cross scan.

25. The method according to claim 24 comprising the further step of flashing the view with strong light at the end of each frame.

26. The method of claim 23 wherein the rate of deflection of the beam of energy is the product of the number of lines per frame and the frame rate, and wherein the frequency above which signals are not passed is equal to the aforesaid product times $\pi/2$.

27. A visibility expander system comprising a viewing device for producing electrical signals indicative of a scene viewed thereby,
said viewing device having means for sequentially and successively scanning the scene by means of a beam of energy, means for adjusting the size of said beam of energy to produce electrical signals indicative of objects only of a specified minimum size and larger, said means for scanning having means for establishing a frame rate sufficient to substantially prevent flicker detectable by the human eye, said means for scanning having further means for establishing a number of scan lines per frame that is a function of the size of the scene to be viewed and the size of the beam of energy, said means for scanning having still further means for deflecting the beam of energy at a rate which is a function of the number of lines per frame and the frame rate, said means for scanning deflecting said beam of energy such that contiguous lines substantially abut one another, a non-peaking, roll-off, low-pass filter passing signals up to a predeterminable frequency that is a function of scan lines per second and scan lines per frame, a window amplifier for selectively increasing the amplitude differences between signals lying in a predeterminable range of amplitudes, and means for displaying the signals produced by said window amplifier.

28. A visibility expander system according to claim 27 further comprising means for selectively varying the range of amplitudes of said signals having amplitude differences increased.

29. A visibility expander system according to claim 28 wherein said further means of said means for scanning establishes a number of lines equal to the width of the scene divided by the width of said beam of energy.

30. A visibility expander system according to claim 29 wherein said function of said still further means is a multiplication function.

31. A visibility expander system according to claim 30 wherein said predeterminable frequency is the product of said multiplication function times $\pi/2$.

32. The method according to claim 21 further comprising the steps of scanning the pictures in alternation with frames scanned perpendicular to one another.

33. The method of expanding the visibility of certain elements of a view comprising the steps of:

converting the view to a sequence of signals having a parameter varying as a function of the intensity of light representing various elements of the view, conversion being effected by scanning the picture with a beam of energy to form a series of frames comprised of a series of lines, scanning occuring at a frame rate such that flicker is substantially undetectable by the human eye upon subsequent conversion of the signals to a picture, the beam of energy having a transverse size such that signals indicative of an object having a minimum predetermined size in the view may be detected for subsequent viewing upon conversion of the signals, the transverse size of the beam of energy being further such that at a scan and line rate that produces signals at a specified frequency all elements of the view are interrogated by the beam of energy;

substantially eliminating signals above said specified frequency;

processing the signals below said specified frequency to increase the differences between said parameter of the signals lying in a predeterminable range of parameters; and displaying a picture indicative of the processed signals.

34. A picture visibility expander system according to claim 1 or 27 wherein said window amplifier includes means for producing an overall gain characteristic which provides a first determinable gain over a first range of input signal amplitudes, a second determinable gain higher than said first determinable gain, over a second range of input signal amplitudes in which are greater than the amplitudes of said first range and a further determinable gain lower than said second determinable, gain in a third range of input signal amplitudes which are greater than said amplitudes of said second range.

35. A picture visibility expander system according to claim 34 further comprising means for varying the ranges of said amplitudes and means for varying said relative gain characteristics.

36. A picture visibility expander system according to claim 1 or 27 further including means for providing a generally smooth transition between the gain of said window amplifier applicable to signals in said predeterminable amplitude range and the gain applicable to signals in other signal amplitude ranges.

* * * * *